US012549561B2

(12) United States Patent
Goff et al.

(10) Patent No.: US 12,549,561 B2
(45) Date of Patent: Feb. 10, 2026

(54) SYSTEMS AND METHODS FOR DYNAMIC ACCESS PERMISSIONS TO SECURE DATA RESOURCES IN A DISTRIBUTED NETWORK

(71) Applicant: BANK OF AMERICA CORPORATION, Charlotte, NC (US)

(72) Inventors: Malu Goff, Plano, TX (US); Michael Dee Conoly, Mesquite, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 176 days.

(21) Appl. No.: 18/099,565

(22) Filed: Jan. 20, 2023

(65) Prior Publication Data

US 2024/0250956 A1 Jul. 25, 2024

(51) Int. Cl.
*H04L 29/06* (2006.01)
*H04L 9/40* (2022.01)
*G06F 21/56* (2013.01)
*G06F 21/62* (2013.01)

(52) U.S. Cl.
CPC .................. *H04L 63/108* (2013.01)

(58) Field of Classification Search
CPC .................................................. H04L 63/108
See application file for complete search history.

(56) References Cited

U.S. PATENT DOCUMENTS

| 7,607,015 | B2 | 10/2009 | Fascenda |
| 8,572,714 | B2 | 10/2013 | Radhakrishnan |
| 9,774,586 | B1 | 9/2017 | Roche et al. |
| 10,454,938 | B2 | 10/2019 | Anderson et al. |

(Continued)

FOREIGN PATENT DOCUMENTS

WO WO-2022251702 A2 * 12/2022 ........... H04L 63/105

OTHER PUBLICATIONS

Sahil Arora, Pranav Khare, Sandeep Gupta; A Machine Learning for Role Based Access Control: Optimizing Role Management and Permission Management; 2024 First International Conference on Pioneering Developments in Computer Science & Digital Technologies (IC2SDT); Jun. 2024; Publisher: IEEE; pp. 158-163 (Year: 2024).*

*Primary Examiner* — Fatoumata Traore
*Assistant Examiner* — Courtney D Fields
(74) *Attorney, Agent, or Firm* — Moore & Van Allen PLLC; Michael M. McCraw

(57) ABSTRACT

Systems, methods, and computer program products are provided herein for dynamic access permissions to secure data resources in a distributed network. An example method includes identifying an application from amongst a plurality of applications with which the system interacts and determining one or more access permissions associated with secure interactions between the system and the identified application. The method further includes determining an absence of a least a first access permission from amongst the one or more access permissions with respect to the system and modifying a database of the system to register the at least first access permission. The one or more access permissions associated with the secure interactions between the system and the identified application define an interaction time period during which at least a first portion of the one or more access permissions were used.

20 Claims, 5 Drawing Sheets

(56) References Cited

U.S. PATENT DOCUMENTS

| | | |
|---|---|---|
| 10,572,874 B1 | 2/2020 | Shahidzadeh et al. |
| 10,863,359 B2 | 12/2020 | Talwar |
| 11,455,641 B1 | 9/2022 | Shahidzadeh et al. |
| 2003/0051140 A1 | 3/2003 | Buddhikot et al. |
| 2008/0189788 A1 | 8/2008 | Bahl |
| 2012/0036550 A1 | 2/2012 | Rodriguez et al. |
| 2012/0204235 A1* | 8/2012 | Jaudon .................. G06F 21/30 726/4 |
| 2019/0139050 A1* | 5/2019 | Maheshwari ........... G06F 21/32 |
| 2020/0053091 A1* | 2/2020 | Childress .............. H04L 63/102 |
| 2021/0144144 A1* | 5/2021 | Parks ...................... H04L 63/20 |
| 2023/0306126 A1* | 9/2023 | Bishop ................ G06F 21/6218 |

* cited by examiner

```
                                                    ┌─ 200
                                                    ▼

┌─────────────────────────────────────────────────────────────────┐
│   IDENTIFY AN APPLICATION FROM AMONGST A PLURALITY OF           │
│   APPLICATIONS WITH WHICH THE SYSTEM INTERACTS                  │
│                            202                                  │
└─────────────────────────────────────────────────────────────────┘
                                 ▼
┌─────────────────────────────────────────────────────────────────┐
│   DETERMINE ONE OR MORE ACCESS PERMISSIONS ASSOCIATED WITH      │
│   SECURE INTERACTIONS BETWEEN THE SYSTEM AND THE IDENTIFIED     │
│   APPLICATION                                                   │
│                            204                                  │
└─────────────────────────────────────────────────────────────────┘
                                 ▼
┌─────────────────────────────────────────────────────────────────┐
│   DEPLOY A TRAINED MACHINE LEARNING (ML) MODEL ON THE ONE OR    │
│   MORE ACCESS PERMISSIONS                                       │
│                            206                                  │
└─────────────────────────────────────────────────────────────────┘
                                 ▼
┌─────────────────────────────────────────────────────────────────┐
│   DETERMINE AN ABSENCE OF A LEAST A FIRST ACCESS PERMISSION     │
│   FROM AMONGST THE ONE OR MORE ACCESS PERMISSIONS WITH          │
│   RESPECT TO THE SYSTEM                                         │
│                            208                                  │
└─────────────────────────────────────────────────────────────────┘
                                 ▼
┌─────────────────────────────────────────────────────────────────┐
│   MODIFY A DATABASE OF THE SYSTEM TO REGISTER THE AT LEAST      │
│   FIRST ACCESS PERMISSION                                       │
│                            210                                  │
└─────────────────────────────────────────────────────────────────┘
                                 ▼
┌─────────────────────────────────────────────────────────────────┐
│   GENERATE A USER INTERFACE COMPRISING A VISUAL REPRESENTATION  │
│   OF THE DATABASE MODIFICATION                                  │
│                            212                                  │
└─────────────────────────────────────────────────────────────────┘
```

FIG. 2

SYSTEMS AND METHODS FOR DYNAMIC ACCESS PERMISSIONS TO SECURE DATA RESOURCES IN A DISTRIBUTED NETWORK

TECHNOLOGICAL FIELD

Example embodiments of the present disclosure relate generally to securing data resources and, more particularly, to systems and methods for dynamic access permissions to secure data resources in a distributed network.

BACKGROUND

Electronic networks formed of distributed components may interact with a variety of applications in order to perform the various operations associated with the network. In some instances, access by the system to the applications may be permissioned. Applicant has identified a number of deficiencies and problems associated with conventional access permissions systems and associated methods. Through applied effort, ingenuity, and innovation, many of these identified problems have been solved by developing solutions that are included in embodiments of the present disclosure, many examples of which are described in detail herein.

BRIEF SUMMARY

Apparatuses, systems, methods, and computer program products are provided for dynamic access permissions to secure data resources in a distributed network. In one aspect, a system for dynamic access permissions to secure data resources in a distributed network may include at least one non-transitory storage device and at least one processor coupled to the at least one non-transitory storage device. The at least one processor may identify an application from amongst a plurality of applications with which the system interacts and may determine one or more access permissions associated with secure interactions between the system and the identified application. The at least one processor may further determine an absence of a least a first access permission from amongst the one or more access permissions with respect to the system and may modify a database of the system to register the at least first access permission In some embodiments, in identifying the application from amongst the plurality of applications, the at least one processor may access a plurality of permissions transmissions from one or more of the plurality of applications.

In some embodiments, the one or more access permissions associated with the secure interactions between the system and the identified application may define an interaction time period during which at least a first portion of the one or more access permissions were used.

In some further embodiments, in determining the absence of a least the first access permission, the at least one processor may further compare each of the one or more access permissions in the first portion with access permissions stored by the database. In such an embodiment, the processor may further determine the absence of at least the first access permission in an instance in which the first access permissions fails to be stored by the database.

In some further embodiments, the at least one processor may further iteratively compare each of the one or more access permission in the first portion with the access permissions stored by the database.

In some embodiments, the at least one processor may further deploy a trained machine learning (ML) model on the one or more access permissions to determine the absence of a least the first access permission.

In some embodiments, the at least one processor may further determine a second portion of the one or more access permissions. The second portion may include one or more access permissions that are unused during the interaction time period.

In some further embodiments, the at least one processor may further perform one or more revocation operations associated with the second portion of the one or more access permissions.

In any embodiments, the at least one processor may further generate a user interface including a visual representation of the database modification.

In another aspect, a computer program product for dynamic access permissions to secure data resources in a distributed network is provided. The computer program product may include a non-transitory computer-readable medium comprising code. The code may cause an apparatus to identify an application from amongst a plurality of applications with which the system interacts and may determine one or more access permissions associated with secure interactions between the system and the identified application. The apparatus may further determine an absence of a least a first access permission from amongst the one or more access permissions with respect to the system and may modify a database of the system to register the at least first access permission.

In another aspect, a method for dynamic access permissions to secure data resources in a distributed network is provided. The method may include identifying an application from amongst a plurality of applications with which the system interacts and determining one or more access permissions associated with secure interactions between the system and the identified application. The method may further include determining an absence of a least a first access permission from amongst the one or more access permissions with respect to the system and modifying a database of the system to register the at least first access permission.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below. The features, functions, and advantages that are described herein may be achieved independently in various embodiments of the present disclosure or may be combined with yet other embodiments.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 2 illustrates a method for dynamic access permissions to secure data resources in a distributed network in accordance with one or more embodiments of the present disclosure.

DETAILED DESCRIPTION

Figure 1A:
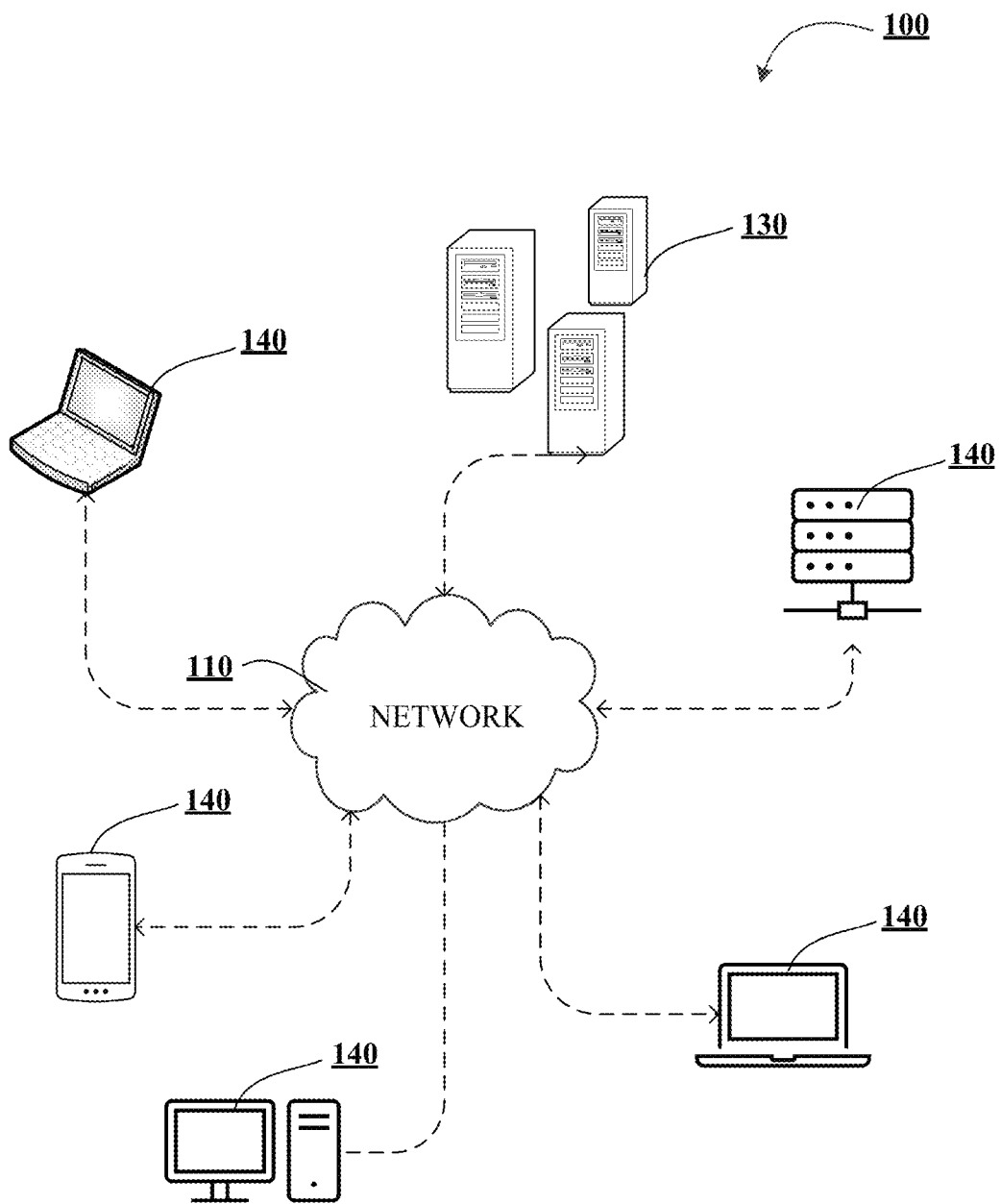
FIGS. 1A-1C illustrate technical components of an exemplary distributed computing environment for dynamic access permissions to secure data resources in a distributed network in accordance with one or more embodiments of the present disclosure.

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, this data may be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with or otherwise interact with an entity. As such, in some embodiments, the user may be an individual having past relationships, current relationships, and/or potential future relationships with an entity. In some embodiments, the user may be an employee (e.g., an associate, a project manager, an IT specialist, a manager, an administrator, an internal operations analyst, or the like) of the entity or enterprises affiliated with the entity. In some embodiments, the user may be a customer (e.g., individual, business, etc.) that transacts with the entity or enterprises associated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users. As described hereinafter, a user interface of the present disclosure may be configured comprise a visual representation of various database modifications associated with access permissions to applications. The present disclosure contemplates that the arrangement, presentation, organization, etc. of the user interfaces described herein may vary based upon the intended application of the system.

As used herein, an "engine" or "module" may refer to core elements of an application, or part of an application that serves as a foundation for a larger piece of software and drives the functionality of the software. In some embodiments, an engine or module may be self-contained, but externally-controllable code that encapsulates powerful logic designed to perform or execute a specific type of function. In one aspect, an engine or module may be underlying source code that establishes file hierarchy, input and output methods, and how a specific part of an application interacts or communicates with other software and/or hardware. The specific components of an engine or module may vary based on the needs of the specific application as part of the larger piece of software. In some embodiments, an engine or module may be configured to retrieve resources created in other applications, which may then be ported into the engine for use during specific operational aspects of the engine. An engine or module may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," "communicably coupled" and/or the like as used herein, means that the components may be formed integrally with each other, or may be formed separately and coupled together. Furthermore, the components may be formed directly to each other, or to each other with one or more components located between the components that are operatively coupled together. Furthermore, the components may be detachable from each other, or they may permanently coupled together. Furthermore, operatively coupled components may mean that the components retain at least some freedom of movement in one or more directions or may be rotated about an axis (e.g., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, a system and an application, an accessing of stored data by one or more nodes of a computing cluster, a transmission of a requested task, or the like. As described hereinafter, an "interaction" between the system and one or more applications may be permissioned in that the ability for the system (e.g., one or more devices, subsystems, modules, etc.) to access a particular application may be controlled by permissions issued by this application.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As described above, electronic networks formed of distributed components may interact with a variety of applications in order to perform the various operations associated with the network. In some instances, access by the system to the applications may be permissioned. For example, $3^{rd}$ party systems associated with particular applications may periodically transmit a list of permissions associated with the applications, and the system may register these permissions in a centralized and secured database. In an instance in which a permission is missing from the provided listing of permissions (e.g., intentionally or inadvertently), traditional systems are incapable of effectively determining the absence of this permission.

In order to solve these issues and others, embodiments of the present disclosure provide systems and methods for identifying the various permissions associated with applications with which the system interacts and determining the absence of at least one permission. The system may subsequently modifying a centralized and secure database to register the absent permission. In some instances, the system may identify interaction time periods that define a time period during which particular permissions were used by the system and compare portions of the various access permissions used during this time period against permissions currently stored by the system database. In some instances, machine learning models may be deployed to identify absent permissions and/or the system may operate to determine permissions which were unused during particular time periods and perform associate revocation operations associated with these unused permissions.

Example System and Circuitry Components

Figure 1B:
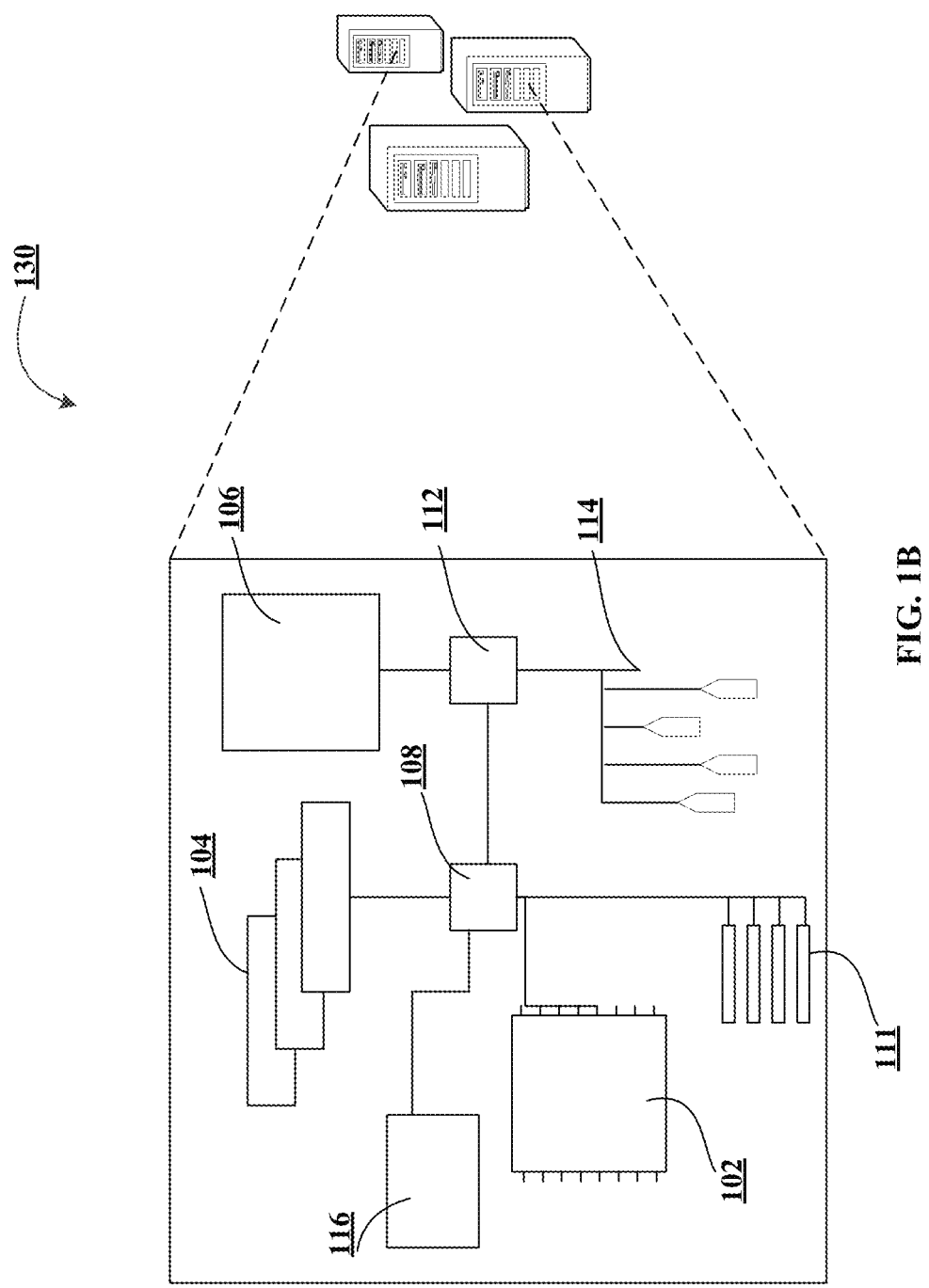
Figure 1C:
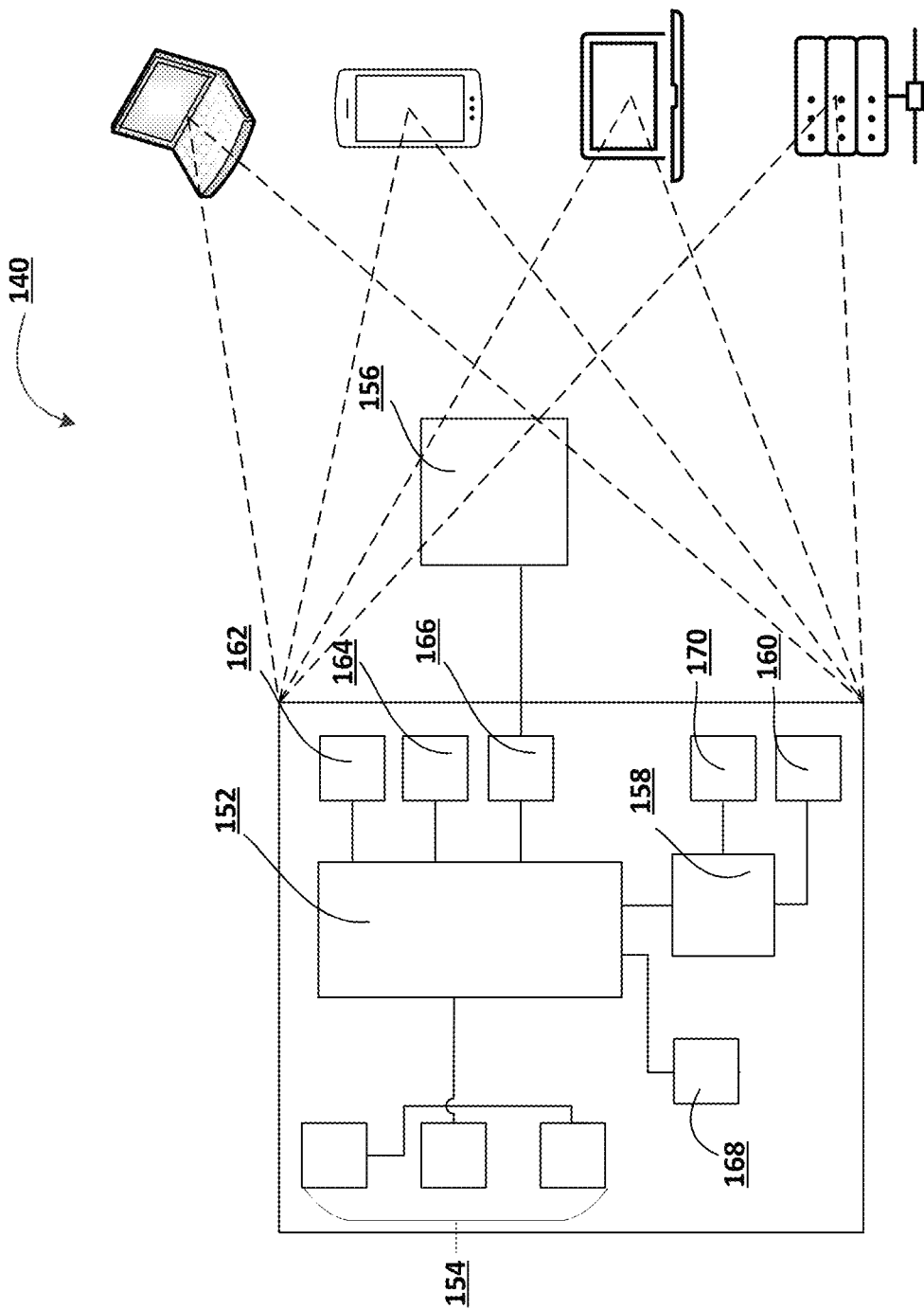

FIGS. 1A-1C illustrate technical components of an exemplary distributed computing environment for dynamic access permissions to secure data resources in a distributed network 100, in accordance with one or more embodiments of the present disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, the same or similar to system 130, with each system providing portions of the necessary operations (e.g., as a server bank, a group of blade servers, or a multi-processor system).

In some embodiments, the system 130 and the end-point device(s) 140 may define a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 have the same abilities to use the resources available on the network 110. As opposed to relying upon a central server (e.g., system 130) that acts as the shared drive, each device that is connected to the network 110 acts as the server for the files stored thereon.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., an automated teller machine (ATM)), and/or edge devices such as routers, routing switches, integrated access devices (IAD), and/or the like.

The network 110 may be a distributed network that is spread over different networks. This provides a single data communication network that may be managed jointly or separately by each network. In addition to shared communication within the network, the distributed network may also support distributed processing. The network 110 may be a form of digital communication network, such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the embodiments of the present disclosure. In one example, the distributed computing environment 100 may include more, fewer, or different components. In another example, some or all of the portions of the distributed computing environment 100 may be combined into a single portion, or all of the portions of the system 130 may be separated into two or more distinct portions.

FIG. 1B illustrates an exemplary component-level structure of the system 130, in accordance with one or more embodiments of the present disclosure. As shown in FIG. 1B, the system 130 may include a processor 102, memory 104, input/output (I/O) device 116, and/or a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 may process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 may be capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and/or to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with one or more embodiments of the present disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a Microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user (e.g., an actionable notification or the like). The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 may be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here may be realized in digital electronic circuitry, integrated circuitry, specially designed ASICs (application specific integrated circuits), computer hardware, firmware, software, and/or combinations thereof.

Example Methods for Dynamic Access Permissions

FIG. 2 illustrates a flowchart containing a series of operations for example dynamic access permissions to secure data resources in a distributed network (e.g., method 200). The operations illustrated in FIG. 2 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, processor 152, etc.).

As shown in operation 202, the system 130 may be configured to identify an application from amongst a plurality of applications with which the system interacts. As described above, the system 130 of the present disclosure may interact with a plurality of applications that, in whole or in part, facilitate various operations of the system 130. As described herein with reference to absent permissions, the system 130 may identify a plurality of applications with which the system 130 interacts (e.g., via one or more subsystems, modules, etc.). In some embodiments, the system 130 may analyze each of the applications with which the system 130 interacts to identify applications that include access permissions, such that these applications may be candidates for the operations described herein with reference to FIG. 2. In other embodiments, the system 130 may periodically (e.g., according to a determined frequency or the like) sample the data associated with applications with which it interacts to determine a permissions status or update associated with the application. Additionally or alternatively, in some embodiments, the system 130 may identify an application from amongst a plurality of applications with which the system 130 in response to an action by the system 130 to interact with the particular application.

Thereafter, as shown in operation 204, the system 130 may be configured to determine one or more access permissions associated with secure interactions between the system 130 and the identified application. As described hereafter with reference to FIG. 3, the applications with which the system 130 interacts may transmit a listing (e.g., dataset, series, etc.) of the permissions associated with the particular application. In such an embodiment, the determination at operation 204 may refer to the analysis of the listing provided by the identified application in order to determine the one or more access permissions associated with secure interactions between the system and the identified application. In other embodiments, the system 130 may generate and transmit one or more requests to the identified application in order to prompt transmission of the identified application to provide the one or more access permissions associated with secure interactions between the system 130 and the identified application. In some embodiments, the system 130 may access one or more databases (e.g., repositories or the like) that store example permissions associated with applications. In doing so, the system 130 may at least partially infer, such as via the machine learning models described hereafter, the one or more access permissions associated with secure interactions between the system and the identified application.

In some embodiments, as shown in operation 206, the system 130 may be configured to deploy a trained machine learning (ML) model on the one or more access permissions to determine the absence of a least the first access permission. The trained ML model may also refer to a mathematical model generated by machine learning algorithms based on training data (e.g., various feature sets of access permissions), to make predictions or decisions without being explicitly programmed to do so. The trained ML model may similarly represent what was learned by the selected machine learning algorithm and represent the rules, numbers, and any other algorithm-specific data structures required for decision-making. Selecting the right machine learning algorithm may depend on a number of different factors, such as the problem statement and the kind of output needed, type and size of the data, the available computational time, number of features and observations in the data, and/or the like. The trained ML model or algorithm may also refer to programs that are configured to self-adjust and perform better as they are exposed to more data. To this extent, the trained ML model or algorithm is also capable of adjusting its own parameters, based on previous performance in making prediction about a dataset.

The ML algorithms contemplated, described, and/or used herein (e.g., the trained ML model) may include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

The ML models may be trained using repeated execution cycles of experimentation, testing, and tuning to modify the performance of the ML algorithm and refine the results in preparation for deployment of those results for consumption or decision making. The ML models may be tuned by dynamically varying hyperparameters in each iteration (e.g., number of trees in a tree-based algorithm or the value of alpha in a linear algorithm), running the algorithm on the data again, and then comparing its performance on a validation set to determine which set of hyperparameters results in the most accurate model. The accuracy of the model is the measurement used to determine which set of hyperparameters is best at identifying relationships and patterns between variables in a dataset based on the input, or training data. A fully trained ML model is one whose hyperparameters are tuned and model accuracy maximized.

Thereafter, as shown in operation 208, the system 130 may be configured to determine an absence of a least a first access permission from amongst the one or more access permissions with respect to the system 130. As described above, in some instances, the permissions provided by the application (or otherwise received by the system 130) may fail to include particular permissions necessary for secure interactions between the system 130 and the identified application. In some embodiments, as described above with reference to operation 206, the system 130 may use iteratively trained ML models and algorithms to predict the absence of at least a first access permission with respect to the system 130. By way of a nonlimiting example, the ML models and algorithms may be trained upon various prior attempts by the system (e.g., via subsystems, modules, etc.) to, successfully or unsuccessfully, access the identified application and/or prior attempts by the system (e.g., via subsystems, modules, etc.) to, successfully or unsuccessfully, access the other applications with which the system 130 interacts.

Figure 3:
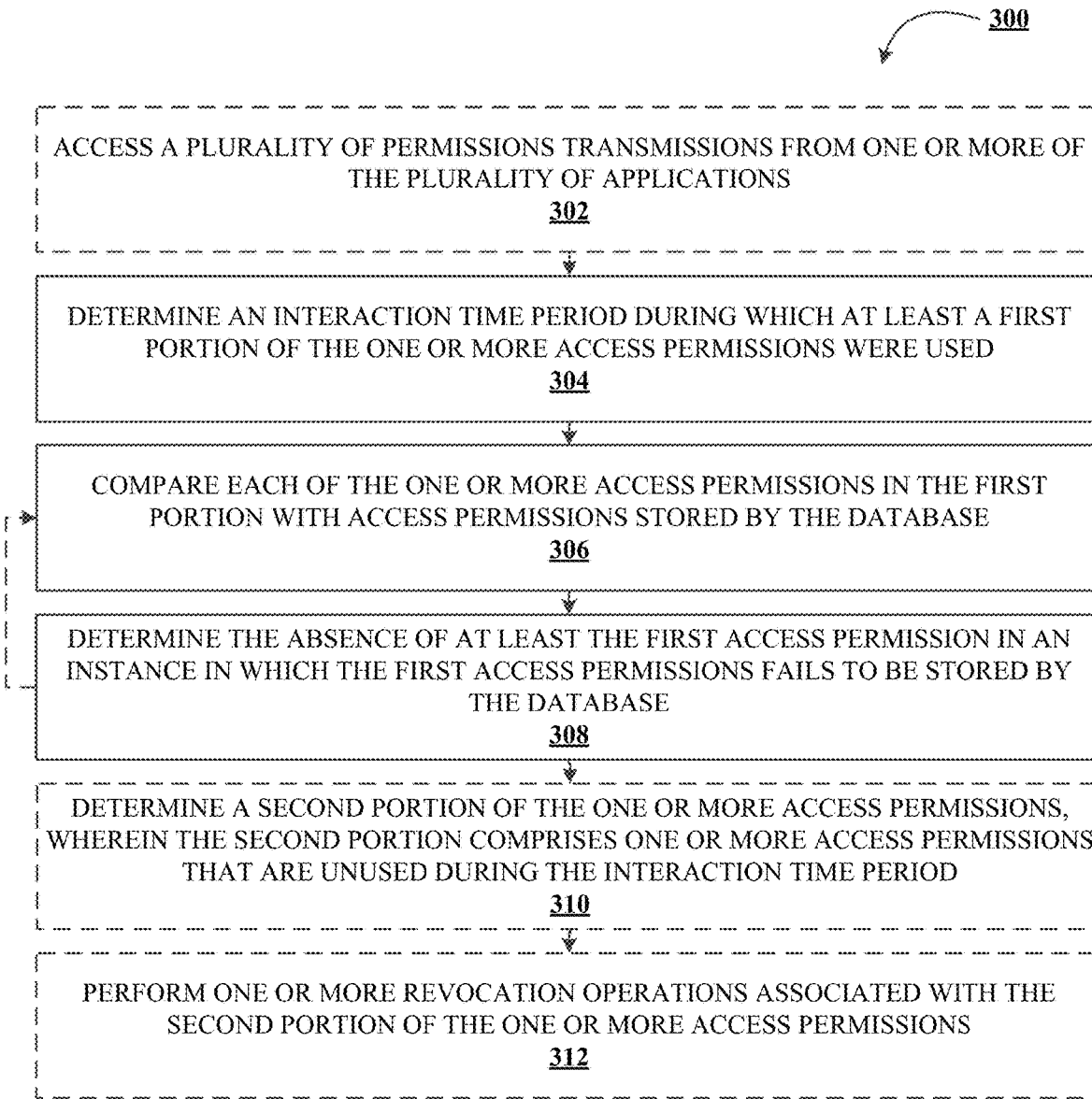
FIG. 3 illustrates a method for interaction time based comparisons and revocation operations in accordance with one or more embodiments of the present disclosure.

In some embodiments, as described hereafter with reference to FIG. 3, the one or more access permissions associated with the secure interactions between the system 130 and the identified application may define or otherwise be associated with an interaction time period during which at least a first portion of the one or more access permissions were used. By way of example, the system 130 may set various time periods (associated with dormancy control or otherwise) within which to analyze the data associated with access permissions. In such an example, the system 130 may identify a first portion of the one or more access permissions associated with secure interactions between the system 130 and the identified application that were used by the system 130 during the particular time period (e.g., an interaction time period). The system may then compare each of the one or more access permissions in the first portion with access permissions stored by the system 130 in a centralized and secure database and determine the absence of at least the first access permission in an instance in which the first access permissions fails to be stored by the database. Said differently, the system may iteratively scan the database to determine the absence of particular access permissions (e.g., at least the first access permission) associated with particular applications.

Thereafter, as shown in operation 210, the system 130 may be configured to modify the database of the system 130 to register the at least first access permission. As described above, the system 130 may leverage one or more secured databases within which the system 130 stores application access permissions. In the event that the system 130 identifies a missing access permission (e.g., an absent first access permission), the system 130 may register this missing access permission (e.g., the absent first access permission) to ensure that the system's 130 repository of access permission remains complete or otherwise updated. The present disclosure contemplates that the registration of the first access permission as described herein may leverage one or more transmissions between the system 130 and the identified application to receive data required to register the first access permission. Although described herein with reference to a first access permission that is absent, the present disclosure contemplates that the operations herein may be applicable to any number of access permissions associated with any number of respective applications.

In some embodiments, as shown in operation 212, the system 130 may be configured to configured to generate a user interface comprising a visual representation of the database modification. By way of example, the system 130 may be associated with or accessible by a plurality of users, operators, etc. As such, these users, operators, etc. may periodically review the permissions status of various applications with which the system 130 securely interacts. To facilitate ease of use by the users, operators, etc., the system 130 may generate a user interface that displays (e.g., comprises a visual representation), the database modification generated at operation 210. As would be evident to one of ordinary skill in the art in light of the present disclosure, the user interface may display various actional objects configured to receive a user input. By way of a non-limiting example, the user interface may present actionable objects that allow a user to accept or decline the modification to the database.

FIG. 3 illustrates a flowchart containing a series of operations for interaction time based comparisons and revocation operations (e.g., method 300). The operations illustrated in FIG. 3 may, for example, be performed by, with the assistance of, and/or under the control of an apparatus (e.g., system 130, end-point devices 140, etc.), as described above. In this regard, performance of the operations may invoke one or more of the components described above with reference to FIGS. 1A-1C (e.g., processor 102, processor 152, etc.).

As shown in operation 302, in some embodiments, the system 130 may be configured to access a plurality of permissions transmissions from one or more of the plurality of applications. As described above with reference to operations 202-204, the applications with which the system 130 securely may transmit a listing (e.g., dataset, series, etc.) of the permissions associated with the particular application. In such an embodiment, the system 130 may analyze the listing(s) provided by the identified application in order to determine the one or more access permissions associated with secure interactions between the system and the identified application.

Thereafter, as shown in operation 304, in some embodiments, the system 130 may be configured to determine an interaction time period during which at least a first portion of the one or more access permissions were used. As described above, the system 130 may set various time periods (associated with dormancy control or otherwise) within which to analyze the data associated with access permissions. In such an example, the system 130 may identify a first portion of the one or more access permissions associated with secure interactions between the system 130 and the identified application that were used by the system 130 during the particular time period (e.g., an interaction time period).

Thereafter, as shown in operations 306 and 308, the system 130 may be configured to compare each of the one or more access permissions in the first portion with access permissions stored by the database and determine the absence of at least the first access permission in an instance in which the first access permissions fails to be stored by the database. As described above, the system 130 may, via a centralized and secure database, store access permissions associated with a plurality of applications. As such, the comparison at operation 306 may refer to a comparison between the one or more access permissions in the first portion and the plurality of access permissions stored by the system 130 via the database. Based on this comparison, the system 130 may determine the absence of at least the first access permission in an instance in which the first access permissions fails to be stored by the database. Said differently, the system may iteratively scan the database to determine the absence of particular access permissions (e.g., at least the first access permission) associated with particular applications.

In some embodiments, as shown in operation 310, the system 130 may be configured to determine a second portion of the one or more access permissions where the second portion comprises one or more access permissions that are unused during the interaction time period. By way of example, in performing the absence determination operations described above, the system 130 may identify permissions that exist within the database of the system 130 but which have not been used during the time period (e.g., interaction time period) defined by the system 130. In some embodiments, the second portion may include access permissions that have not been used during the interaction time period while in other embodiments, the second portion may include access permissions that fail to satisfy a minimum use threshold during the interaction time period.

Thereafter, as shown in operation 312, the system 130 may be configured perform one or more revocation operations associated with the second portion of the one or more access permissions. By way of example, the system 130 may purge, delete, or otherwise remove access permissions that have not been frequently used during the interaction time period. IN doing so, the system 130 may operate to reduce storage burdens and prevent or reduce security threats due attributed to stale access permissions. The present disclosure contemplates that the interaction time period may vary based upon the intended application of the system 130. In some embodiments, the interaction time period may be application-specific or otherwise dynamically vary based upon operational characteristics of the system 130.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that may direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments may be configured without departing from the scope and spirit of the disclosure. Therefore, it is to be understood that, within the scope of the appended claims, the disclosure may be practiced other than as specifically described herein.

What is claimed is:

1. A system for dynamic access permissions to secure data resources in a distributed network, the system comprising:
   at least one non-transitory storage device; and
   at least one processor coupled to the at least one non-transitory storage device, wherein the at least one processor is configured to:
     access a plurality of permissions transmissions from a plurality of applications with which the system interacts;
     identify an application from amongst the plurality of applications;
     determine a plurality of access permissions which collectively enable secure interactions between the system and the identified application, such that each of the plurality of access permissions are required for establishing a secure interaction between the system and the identified application, wherein the plurality of access permissions are received by the system via the plurality permissions transmissions;
     deploy a trained machine learning (ML) model on the one or more access permissions;
     determine an absence of at least a first access permission from amongst the plurality of access permissions with respect to the system indicative of an absence of the first access permission in the plurality of permissions transmissions received by the system, wherein the absence of the first access permission is determined based on an inference by the trained ML model, and wherein the absence of the first access permission from amongst the plurality of access permission precludes establishing the secure interaction between the system and the identified application; and
     modify a database of the system to register the at least first access permission.

2. The system of claim 1, wherein the plurality of access permissions associated with the secure interactions between the system and the identified application define an interaction time period during which at least a first portion of the one or more access permissions were used.

3. The system of claim 2, wherein, in determining the absence of a least the first access permission, the at least one processor is further configured to:

compare each of the access permissions in the first portion with access permissions stored by the database; and determine the absence of at least the first access permission in an instance in which the first access permissions fails to be stored by the database.

4. The system of claim 3, wherein the at least one processor is further configured to iteratively compare each of the access permissions in the first portion with the access permissions stored by the database.

5. The system of claim 2, wherein the at least one processor is further configured to determine a second portion of the plurality of access permissions, wherein the second portion comprises one or more access permissions that are unused during the interaction time period.

6. The system of claim 5, wherein the at least one processor is further configured to perform one or more revocation operations associated with the second portion of the one or more access permissions.

7. The system of claim 1, wherein the at least one processor is further configured to generate a user interface comprising a visual representation of the database modification.

8. A computer program product for dynamic access permissions to secure data resources in a distributed network, the computer program product comprising a non-transitory computer-readable medium comprising code causing an apparatus to:

access a plurality of permissions transmissions from a plurality of applications with which the system interacts;

identify an application from amongst the plurality of applications;

determine a plurality of access permissions which collectively enable secure interactions between the system and the identified application, such that each of the plurality of access permissions are required for establishing a secure interaction between the system and the identified application, wherein the plurality of access permissions are received by the system via the plurality permissions transmissions;

deploy a trained machine learning (ML) model on the one or more access permissions;

determine an absence of at least a first access permission from amongst the plurality of access permissions with respect to the system indicative of an absence of the first access permission in the plurality of permissions transmissions received by the system, wherein the absence of the first access permission is determined based on an inference by the trained ML model, and wherein the absence of the first access permission from amongst the plurality of access permission precludes establishing the secure interaction between the system and the identified application; and modify a database of the system to register the at least first access permission.

9. The computer program product of claim 8, wherein the plurality of access permissions associated with the secure interactions between the system and the identified application define an interaction time period during which at least a first portion of the one or more access permissions were used.

10. The computer program product of claim 9, wherein, in determining the absence of a least the first access permission, the apparatus is further configured to:

compare each of the access permissions in the first portion with access permissions stored by the database; and determine the absence of at least the first access permission in an instance in which the first access permissions fails to be stored by the database.

11. The computer program product of claim 10, wherein the apparatus is further configured to iteratively compare each of the access permission in the first portion with the access permissions stored by the database.

12. The computer program product of claim 9, wherein the apparatus is further configured to determine a second portion of the plurality of access permissions, wherein the second portion comprises one or more access permissions that are unused during the interaction time period.

13. The computer program product of claim 12, wherein the apparatus is further configured to perform one or more revocation operations associated with the second portion of the one or more access permissions.

14. A method for dynamic access permissions to secure data resources in a distributed network, the method comprising:

accessing a plurality of permissions transmissions from a plurality of applications with which the system interacts;

identifying an application from amongst the plurality of applications;

determining a plurality of access permissions which collectively enable secure interactions between the system and the identified application, such that each of the plurality of access permissions are required for establishing a secure interaction between the system and the identified application, wherein the plurality of access permission are received by the system via the plurality permissions transmissions;

determining an absence of at least a first access permission from amongst the plurality of access permissions with respect to the system indicative of an absence of the first access permissions in the plurality of permissions transmissions received by the system, wherein the absence of the first access permission is determined based on an inference by the trained ML model, and wherein the absence of the first access permission from amongst the plurality of access permission precludes establishing the secure interaction between the system and the identified application; and modifying a database of the system to register the at least first access permission.

15. The method of claim 14, wherein the one or more access permissions associated with the secure interactions between the system and the identified application define an interaction time period during which at least a first portion of the one or more access permissions were used.

16. The method of claim 15, wherein determining the absence of a least the first access permission further comprises:

comparing each of the plurality of access permissions in the first portion with access permissions stored by the database; and determining the absence of at least the first access permission in an instance in which the first access permissions fails to be stored by the database.

17. The method of claim 16, further comprising iteratively comparing each of the access permissions in the first portion with the access permissions stored by the database.

18. The method of claim 16, further comprising determining a second portion of the plurality of access permissions, wherein the second portion comprises one or more access permissions that are unused during the interaction time period.

19. The method of claim 18, further comprising performing one or more revocation operations associated with the second portion of the one or more access permissions.

20. The method of claim 14, further comprising generating a user interface comprising a visual representation of the database modification.

\* \* \* \* \*